United States Patent [19]
Martin

[11] Patent Number: 6,154,776
[45] Date of Patent: Nov. 28, 2000

[54] QUALITY OF SERVICE ALLOCATION ON A NETWORK

[75] Inventor: Jean-Christophe Martin, Varces, France

[73] Assignee: Sun Microsystems, Inc., Mountain View, Calif.

[21] Appl. No.: 09/045,546

[22] Filed: Mar. 20, 1998

[51] Int. Cl.$^7$ .............................. G06F 13/38; G06F 15/17
[52] U.S. Cl. .......................... 709/226; 709/223; 709/224; 709/235; 709/240; 370/390; 370/396
[58] Field of Search ................................... 709/233, 234, 709/235, 240

[56] References Cited

U.S. PATENT DOCUMENTS

| | | | |
|---|---|---|---|
| 5,674,003 | 10/1997 | Andersen et al. | 364/514 |
| 5,884,301 | 3/1999 | Takano | 707/3 |
| 5,966,531 | 10/1999 | Skeen et al. | 395/683 |
| 5,987,306 | 11/1999 | Nilsen et al. | 455/67.1 |

OTHER PUBLICATIONS

Ukiah Software, Inc.,"NetRoad Traffic Ware—Eliminates Anarchy at the internet Access Point and Improves Performance" Data sheet, Dec., 1997, www.ukiahsoft.com/trafficds.pdf.

Theresa W. Carey, "Control Internet Bottlenecks", Jan. 1998, www.microsoft.com/mind/0198/stuff0198.htm.

Erica Roberts, "Taking the Effort Out of Bandwidth Management", Jan. 1998, www.data.com/hot_products/netroad.html.

Bolot et al., "Evaluating Caching Schemes for the X.500 Directory System", Proceedings of the Int'l Conference on Distributed Computing Systems, IEEE, May 25, 1993.

Michele Wright, "Using Policies for Effective Network Management," International Journal of Network Management, vol. 9, No. 2, Mar.–Apr. 1999.

"Remote Authentication Dial In User Service (RADIUS)", Rigney etal.,, (RFC 2138), Standards Track, pp. 1–65, Apr. 1997.

"Dynamic Host Configuration Protocol", R. Droms, (RFC 2131) Standards Track, pp. 1–45, Mar. 1997.

"Lightweight Directory Access Protocol", Yeong et al., (RFC 1777) pp. 1–22(17 Pages) Mar. 1995.

Internet Draft "draft–ellesson–sla–schema–oo.txt", Pgaes ii–xxv, Feb. 19, 1998.

"Directory—enabled Networks—Information Model and Base Schema", Version 2.0,2–2, pp. 1–57, Feb. 17, 1998.

"Application Class of Service Schemata", Debasish Biswas, Berkeley Networks, Inc., p. 1–7, Feb. 19, 1998.

"Policy Based Signaling QoS", 6 Pages, Jan. 12, 1998.

Microsoft Press Computer Dictionary Third edition, p. 72 1997.

*Primary Examiner*—Zarni Maung
*Assistant Examiner*—Mahmanzar Moezzi
*Attorney, Agent, or Firm*—Beyer Weaver & Thomas, LLP

[57] ABSTRACT

A Quality of Service (QoS) method and mechanism enable allocation of a QoS to a flow on a network in a dynamic environment in response to detection of a new instance of an entity associated with a flow on the network. A binding is determined between the flow and the entity which is based on at least one parameter of the flow. A QoS definition is maintained in a directory service of the network. The QoS definition includes at least one configuration rule for the flow. A QoS definition for the entity is accessed, which QoS definition binds the flow with a QoS. Configuration rules of the QoS definition are applied to the flow to configure the flow. The detection of a new instance of an entity could be in response to a flow event or in response to a directory event resulting, for example, from a login event.

35 Claims, 6 Drawing Sheets

QUALITY OF SERVICE ALLOCATION ON A NETWORK

BACKGROUND OF THE INVENTION

This invention relates to Quality of Service allocation on a network, for example on the Internet, or an intranet.

Conceptually, the Internet provides three sets of services. At the lowest level, a connectionless delivery system provides a foundation on which everything rests. At the next level, a reliable transport service provides a high level platform. At the third level, application services are provided which rely on the reliable transport service.

A fundamental Internet service consists of an unreliable, connectionless, best-effort, packet delivery system. The service is described as being "unreliable" because delivery is not guaranteed. A packet may be lost, duplicated, or delivered out of order, but the Internet will not detect such conditions, nor will it inform the sender or receiver. The service is described as being "connectionless" because each packet is treated independently from all others. A sequence of packets sent from one machine to another may travel over different paths, or some may be lost while others are delivered. The service may be described as "best-effort" because the Internet aims to deliver packets but does not guarantee delivery.

The protocol that defines the unreliable, connectionless, delivery mechanism is called the "Internet Protocol", and is usually referred to by its initials IP. IP defines the formal specification of data formats, including a basic unit of data transfer and the exact format of all data passing across the Internet. IP also includes rules which specify how packets should be processed and how errors should be handled. In particular, IP embodies the idea of unreliable delivery and packet routing.

Above the IP layer of the Internet protocol structure one service which is provided is a reliable transport service which is typically called the "reliable stream transport service", defined by the Transmission Control Protocol (TCP). The combination of the TCP protocol and the underlying Internet Protocol (IP) is often referred to as TCP/IP.

The reliable stream delivery service provided by the TCP can be contrasted with the unreliable datagram protocol (UDP) which is also provided over the Internet. The UDP provides an unreliable delivery service because delivery is not guaranteed. For example, packets may be lost or destroyed when transmission errors interfere with data, when network hardware fails, or when networks become too heavily loaded to accommodate the load presented.

The TCP on the other hand has a complex structure providing delivery by means of a stream of bits, divided into eight-bit bytes. The TCP specifies the format of the data and acknowledgements that two computers are to exchange to achieve reliable transfer, as well as the procedure to ensure that data arrives correctly.

As mentioned above, given that the underlying Internet protocol is unreliable, TCP transmissions operate in accordance with a technique known as positive acknowledgement with retransmission. The technique requires a recipient to communicate with the source, sending back an acknowledgement message every time it receives data. The sender keeps a record of each packet that it sends and waits for an acknowledgement before sending the next packet. The sender also starts a timer when it sends its packet and retransmits a packet if the timer expires before the acknowledgement arrives.

The period between the transmission of a message and the receipt of an acknowledgement is termed the Round-Trip-Time (RTT). The RTT varies over time depending upon many factors such as, for example, network loading (e.g., delays at intermediate nodes in the system) and loading on the receiver. An important factor in determining the RTT is the available bandwidth. Thus, where multiple clients have access to a common server, for example, in order to balance the Quality of Service between clients, it is desirable to control factors such as the bandwidth allocated to the individual clients, packet delay, and so on. The control of such factors is typically referred to as the control of a Quality of Service (QoS).

Currently, a QoS for specific information flows is allocated statically based on information contained in the traffic itself, such as IP source address, IP destination address, protocol and ports. The QoS is defined in terms of one or more configuration rules, each of which defines one or more factors, such as the bandwidth for an information flow, buffer sizes, firewall characteristics, etc.

The QoS allocation to an information flow is based on a unique identifier, which is usually constructed from parameters such as the source/destination IP address protocol, source/destination ports and/or any other relevant elements from the data flow. However, the QoS allocation to an information flow belonging to an entity is possible only if these parameters are tightly, and permanently bound to that entity.

Traditional QoS is essentially applied in a static manner. As well as providing limited flexibility, a static configuration has the effect that rules for the QoS may not be used if a user is not logged on to the network.

The Internet and similar intranets have been typically been based on a best effort, first-in-first-out basis. However, a trend to the provision instead of differentiated services over a network leads to a need for a more flexible approach to the allocation of a QoS.

However, there is the problem of how to achieve this. To create a configuration rule based simply on an IP address or a port as in the prior art is not effective where an entity to IP address or entity to port allocation can vary due to dynamic IP and/or port allocation. More generally, where there is dynamic allocation of a flow parameter (e.g., an IP address) to an entity, there is no tight link between the entity and the flow. It should be noted herein that the "entity" could be a user, or more generally could be an application, a piece of equipment or other network entity, and need not be a unitary entity, but could be a compound entity such as a group of users, a set of equipment, etc. Also, a dynamic flow parameter could be an IP address, a port, or any other dynamically allocatable flow parameter.

Particular reference is made hereinafter to dynamic address allocation, although it should be understood that the invention is not limited to environments with dynamic allocation of IP addresses, but also to other environments with, for example, dynamic allocation of ports. Dynamic address allocation is provided under a number of different environments. Examples of such environments are the Remote Authentication Dial in User Service (RADIUS) and the Dynamic Host Configuration Protocol (DHCP). A description of RADIUS is to be found in C Rigney, A Rubens, W Simpson, and S Willens, "Remote Authentication Dial in User Service (RADIUS)", RFC 2138, April 1997. A description of DHCP can be found in R. Droms "Dynamic Host Configuration Protocol", RFC-2131, March 1997.

In such an environment with dynamic allocation of IP parameters (e.g., dynamic IP address allocation), an entity will seek a presence on the network to establish an information flow, typically referred to simply as a "flow".

A conventional, static, approach to the allocation of QoS, with configuration rules (or policies) defining the QoS being established apriori, does not work efficiently, or at all in such an environment. At best, apriori allocation of QoS will result in inefficient use of network resources as the apriori allocation may not be applicable for a particular instance of an information flow. For example, due to bandwidth limitations of a predetermined QoS, a particular instance of an information flow may not be able to make full use of an available bandwidth. Also, in a network with a potentially huge number of entities, apriori installation of QoS will result in erroneous combinations of configuration rules with unused, or overloaded, resources. At worst, the apriori allocation will not work where there is no permanent link between a flow and an entity.

Accordingly, the invention seeks to provide a solution to the provision of a QoS definition for an environment in which dynamic allocation of flow parameters is practised.

SUMMARY OF THE INVENTION

Particular and preferred aspects of the invention are set out in the accompanying independent and dependent claims. Combinations of features from the dependent claims may be combined with features of the independent claims as appropriate and not merely as explicitly set out in the claims.

In accordance with an aspect of the invention, there is provided a computer-implemented method of allocating a Quality of Service (QoS) to a flow on a network. The method comprises:

i) detecting a new instance of an entity associated with the flow on the network;

ii) determining a binding between the flow and the entity based on at least one parameter of the flow;

iii) using the binding to access a QoS definition for the entity, the QoS definition being maintained in a directory service of the network and including at least one configuration rule for the flow, whereby the QoS definition binds the flow with the QoS; and iv) dynamically applying to the flow at least one configuration rule identified by the QoS definition.

As opposed to conventional apriori allocation of QoS configuration rules, an embodiment of the invention provides an allocation of a QoS in response to detection of a new instance of an entity associated with a flow. In this manner the QoS can be allocated dynamically as activity for an entity starts. As a result, the configuration rules are only created when the flows to which they apply are present. Thus they can be allocated dynamically. They can even be based on a flow parameter (e.g., a network address or a port) allocated dynamically. A flexible mapping of a flow to entity binding to the configuration rules is thereby possible.

The detection of a new instance of an entity associated with a flow on the network can be achieved in different ways.

For example, this can be achieved by responding to a flow event in respect of the entity, for example by detecting a flow which does not already have a correct QoS allocated to it. Thus, in one embodiment of the invention the protocol headers (eg. the headers of packets) for a flow are examined and flow parameters are extracted therefrom. A comparison with established rules (policies) can be used to identify flows having a specific configuration rule which is representative of a new instance of an entity associated with a flow. The detection of a flow which does not have any specific rules assigned to it can be subjected to a default rule and also be interpreted as a new instance of an entity associated with that flow.

Alternatively, or in addition, the detection of a new instance of an entity associated with a flow can be achieved in response to a directory event. For instance this can be achieved by responding to changes in a directory of a directory service resulting from, for example, events such as a DHCP dynamic allocation phase or a RADIUS authentication phase.

One or more flow parameters for a flow associated with each new instance of an entity can be used as a key to establish a flow to entity binding. The flow parameters can include dynamically applicable, or allocatable parameters (e.g. an allocated IP address or port number). A QoS identification can be accessed from the directory service by looking for an entry for an entity having this key. The QoS identification forms an identifier representing the flow to entity binding. The QoS identification can then be used in a further stage to retrieve a QoS definition including one or more configuration rules for the flow. The QoS definition thereby binds the flow to the QoS. As a consequence, the QoS definition can then be bound to the entity. In other words, therefore, an embodiment of the invention can provide a method of associating a QoS to a flow belonging to an entity.

The rules (or policies) which form, or are included in, the QoS definition can then be applied to, or installed in, a piece of network equipment to allocate the QoS to the flow for the entity.

In a preferred implementation of the invention, the network equipment detecting a new instance of a new flow for an entity and for allocating the QoS is the same. However, these functions could be separated.

The "entity" could be a user, an application, a piece of equipment, or other network entity, and need not be a unitary entity, but could be a compound entity such as a group of users, a set of equipment, etc.

The dynamically applicable flow parameters can be extracted from a protocol header and can include one or more of, for example, an IP address (either source or destination address depending on the direction of the flow), the protocol under which the information flow is operable, and source and/or destination ports. Although the invention is particularly directed to such a dynamic environment, it can also be used in an environment where IP allocation is static.

In accordance with another aspect of the invention there is provided a QoS mechanism for allocating a QoS definition to a flow on a network. The QoS mechanism includes a controller configured to be responsive to detection of a new instance of an entity associated with a flow on the network to determine a binding between the flow and the entity based on at least one parameter of the flow. A directory interface is configured to access a QoS definition. The QoS definition is maintained in a directory service of the network and includes at least one configuration rule for the flow, whereby the QoS definition binds the flow with the QoS. The controller is further configured to be operable to apply at least one configuration rule identified by the QoS definition to the flow on the network.

The directory service maintains a mapping between a flow and an entity, a mapping between the QoS identification and the entity and a mapping between the QoS identification and the QoS definition.

The detection of a new instance of an entity associated with a flow on the network could be determined by the QoS mechanism itself. Alternatively, this could be determined by a separate network element.

Preferably the mechanism includes cache storage for at least one QoS identification and/or for at least one QoS definition and/or for at least one configuration rule. The directory interface is then operable initially to access the cache for retrieving a QoS identification, QoS definition or configuration rule, if present, and if not present to retrieve the QoS identification, QoS definition or configuration rule, as applicable, from the directory service.

The invention also provides a network element comprising a QoS mechanism as described above.

The invention further provides a QoS server comprising a QoS mechanism as described above.

The invention can be implemented by means of a QoS software product on a storage medium.

BRIEF DESCRIPTION OF THE DRAWINGS

Exemplary embodiments of the present invention will be described hereinafter, by way of example only, with reference to the accompanying drawings in which like reference signs relate to like elements and in which.

DESCRIPTION OF THE PREFERRED EMBODIMENTS

Figure 1:
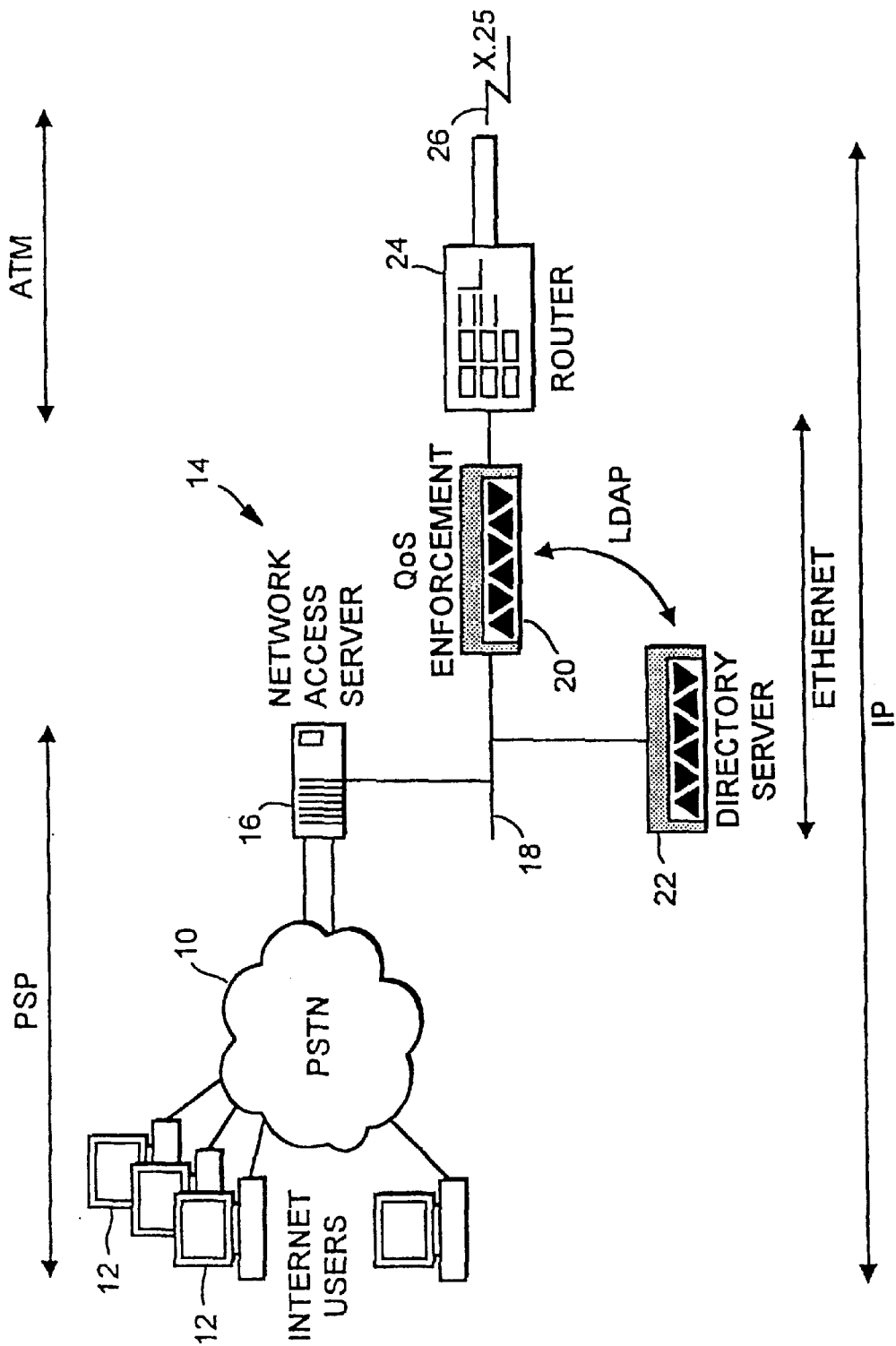
FIG. 1 is a schematic representation of a telecommunications environment including a plurality of stations interconnected via a network.

FIG. 1 is a schematic diagram illustrating an environment forming part of a telecommunications network, in particular part of the Internet, in which an embodiment of the invention is implemented. Although embodiments of the present invention are described in the context of the Internet, it should be appreciated the invention is not limited to these specific embodiments, and that it may be implemented in other environments.

In FIG. 1, users 12 communicate via a telecommunications network, for example a packet switched telecommunications network (PSTN) 10, for example the Internet, operable under a packet switched protocol, with a server site 14, where a number of servers are connected via a local network 18, for example an ethernet network. A network access server 16 can provide access to the PSTN 10 from the server site. A Quality of Service (QoS) enforcement unit controls the allocation and maintenance of QoS to individual information flows. A directory server 22 supports a directory structure for the network. A router 24 enables routing over, for example, an X.25 connection under, for example an Asynchronous Transfer Mode (ATM) protocol 26. The operation of the whole system illustrated in FIG. 1 is based on the Internet Protocol (IP).

In the system shown in FIG. 1, the QoS enforcement unit 20 could implement the invention, although alternatively the QoS functionality could form an integral part of the network access server 16, or of another element of the network. However, in the following description, it is assumed that a separate QoS enforcement unit (or QoS server) 20 is provided.

Communication between the QoS server 20 and the directory server 22 is achieved using the Lightweight Directory Access Protocol (LDAP). Details of LDAP may be found, for example, in W Yeong, T Howes, and S. Kille, "Lightweight Directory Access Protocol", RFC 1777, March 1995.

LDAP is a protocol which enables access to an X.500 type directory without the resource requirements of the Directory Access Protocol (DAP). LDAP enables clients to perform protocol operations against servers by transmitting a protocol request describing the operation to be performed to a server. The server is then responsible for performing the required operations on the directory. After completing the required operations, the server returns a response containing any results or reporting any errors to the client which sent the request.

LDAP needs to operate over a reliable transport service, such as, for example the Transmission Control Protocol (TCP). LDAP message packets can be mapped directly onto the TCP bytestream. The function of the LDAPMessage is to provide an envelope containing common fields required in all protocol exchanges. LDAP provides a common message field, the message ID. The message ID of any request has a value different from the values of any other requests outstanding in an LDAP session of which this message forms a part. The same message ID value is provided in each LDAPMessage containing a response as that of an LDAPMessage which contained a request to which the response relates.

LDAP thus provides an environment within which a QoS mechanism can access and modify a directory in order to access and maintain user parameters for a QoS on a user basis for controlling information flow.

Figure 2:
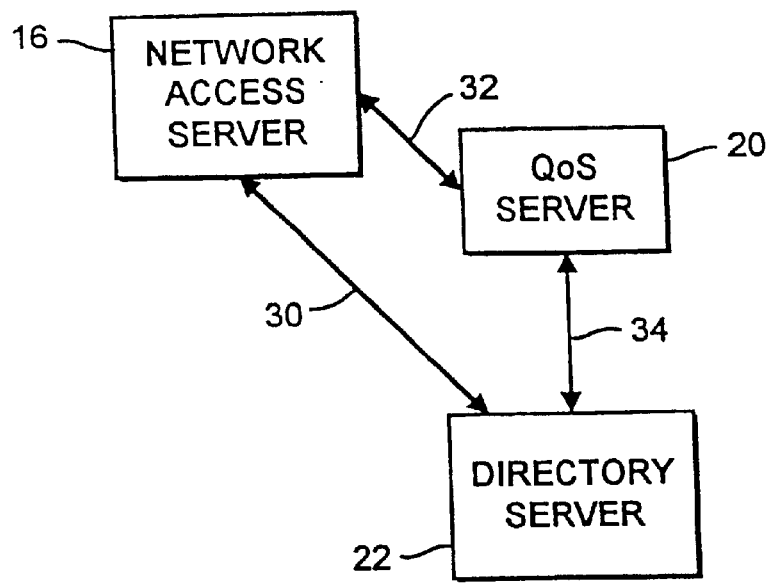
FIG. 2 is a schematic block representation of an interchange of information between servers in the environment of FIG. 1.

FIG. 2 is a schematic representation of an interchange of information between the network access server 16, the QoS server 20 and the directory server 22. It should be noted that this relates to the transfer of control information and not to the information flows for which it is intended to define a QoS.

The exchange of information represented in FIG. 2 is necessary because the network environment is dynamic. For example, IP addresses are typically allocated dynamically, as a result of which the IP address may not uniquely identify a user.

In one embodiment the network access server 16 forms a network element in the form of a RADIUS client for a RADIUS server. The RADIUS client is implemented by a directory server 22 in the present example. It should be noted, however, that this is but one embodiment of the invention. For example, the network access server 16 could provide the combined functionality of a RADIUS client and a RADIUS server. Indeed, more generally, a network access server need not be provided. For example, in another embodiment the network access server could be replaced by a DHCP server.

In the present embodiment, the network access server 16 as well as the QoS server 20 and the directory server 22 are configured to be operable under the LDAP protocol for the exchange of messages as represented by the pathways 30, 32 and 34.

The network access server 16 is thus able to access the directory server for user parameters and also to modify information in the directory server. Likewise the QoS server 20 is able to access both the network access server 16 and the directory server 22 for information. In use, for example, from user session to user session, the user may be dynamically allocated an available IP address by the network access server 16. The network access server 16 is then able to access the directory server 22 to inform the latter and to update the latter with the current information about the user. Under LDAP, it is possible to retrieve user profiles using fields of IP packet headers and to change the QoS of the information flow(s) from the retrieved information.

The QoS server 20 is able to obtain user parameters from the directory server 22 (and/or the network access server 16) and to use this to define QoS factors for the user. However, the QoS server 20 cannot rely on user parameters directly (e.g. a user IP address) to allocate a QoS, as the user's IP address may change. Consequently, the direct use of user parameters would not guarantee a consistent and reliable application of a QoS for that user. In addition, it may be desired to allocate a different QoS for different instances of the user being active on the network. For example, a different QoS may be required between first and second addresses as between first and third addresses.

Accordingly, the QoS server 20 associates an identifier to the user for an information flow (i.e. a flow to user binding), which can be constant from session to session for that flow, even if the parameters associated with the flow for the user, for example the IP address, change.

Figure 3:
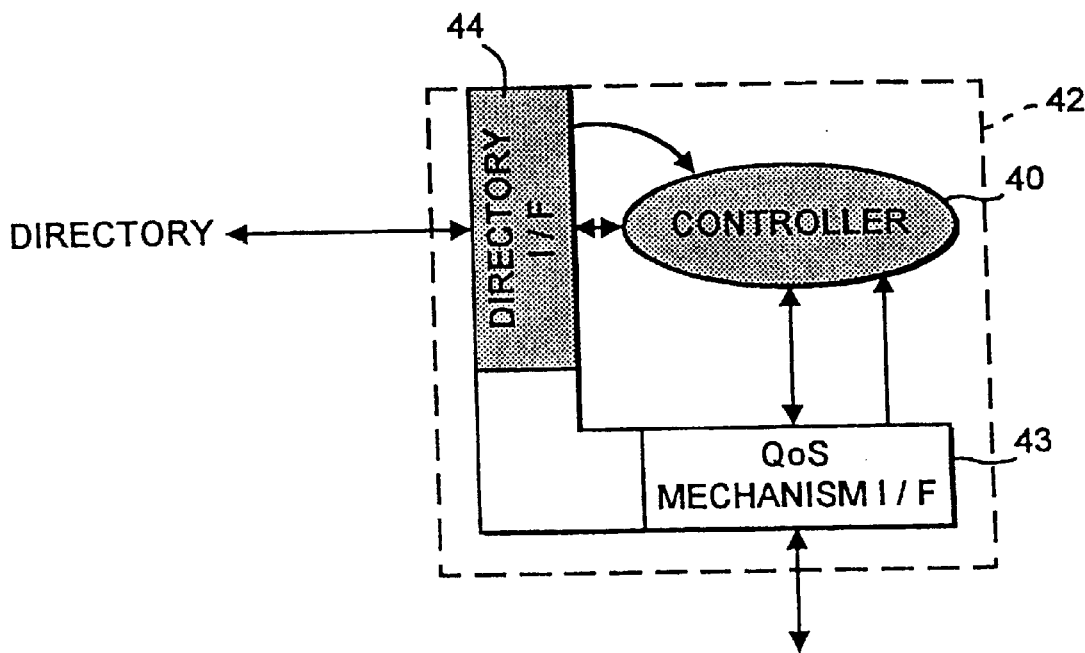
FIG. 3 is a schematic block diagram giving an overview of elements of an example of a QoS mechanism.

FIG. 3 is a schematic overview of aspects a QoS mechanism 42. The QoS mechanism may be part of the QoS server 20, although it could be implemented at another location, for example in a network access server. A QoS controller 40 is responsive to events which are indicative of a new instance of an entity associated with an information flow selectively to access the directory of a directory service by means of a directory interface 44. The controller 40 may make a determination of such an event itself in response to information received via the QoS mechanism interface 43.

For example, the QoS mechanism interface 43 can sample packets relating to information flow and extract from the packet headers (the protocol headers) at least selected parameters representative of the flow. Such parameters can, for example, relate to a user (e.g., IP source or destination addresses), a service (e.g., a protocol and/or a source or destination port), a type of service value and/or the header of a URL (Universal Resource Locator). The controller 40 can be arranged to make a comparison of the selected parameters to established rules (policies) and, in accordance with a logical or deterministic algorithm, to determine whether the flow represents a new instance of an entity associated with the flow.

Alternatively, it may receive a report of such an event from the directory service via the directory interface 44. A report from the directory service can be generated automatically in response to, for example, a directory entry being updated by RADIUS server or a DHCP server (not shown). Such a directory entry update can occur as a result of, for example, the dynamic allocation of a flow parameter (e.g. an IP address or port) to an entity, a record of the allocation then being made by the RADIUS or DHCP server in the entry for the entity in a directory of the directory service. The automatic reporting of the update can be pushed to the directory interface by means of a conventional filter arrangement and, for example, a replication or other conventional automatic reporting mechanism. The directory interface could be arranged to poll the directory service, although this would be less efficient.

The QoS controller 40 and the QoS interface 43 can be thought of as separate components, or their functions could be combined. The QoS mechanism 42 can be implemented as a software mechanism on conventional computing hardware (e.g. a computer including conventional components such as memory, processor, display, user input devices, etc.). Thus the QoS controller 40 and the interfaces can be implemented by code stored in an execution memory and executed on a processor. The memory can thus form a carrier medium for the QoS mechanism 42. The QoS mechanism 42 can also be supplied as a computer program product on a disc, over a network communication line or any other carrier medium. Alternatively, the QoS mechanism can be implemented at least in part by special purpose hardware, for example one or more ASICs.

Figure 4:
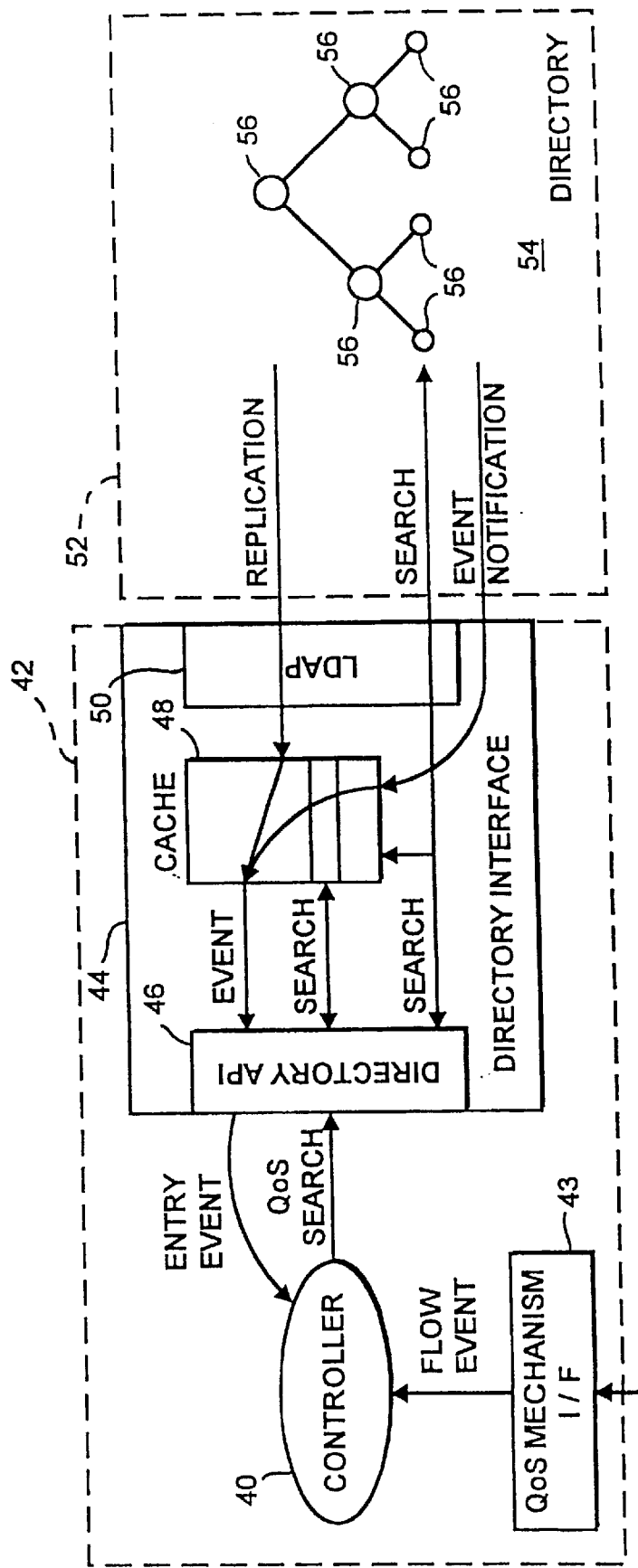
FIG. 4 is a schematic block diagram showing a directory interface of the QoS mechanism of FIG. 3.

FIG. 4 is a schematic block diagram showing the directory interface in more detail. In this particular embodiment, the directory is based on the X.500 model, implementing the Lightweight Directory Access Protocol. In a preferred example the directory server provides an event notification service as illustrated in FIG. 4, for example by means of a replication or other automatic reporting mechanism.

The directory 54 maintained by the directory service (which could be a distributed directory) comprises a hierarchical arrangement of entries 56 including entries for entities. The entry for an entity can contain, for example, the identification of that entity and also the current value of one or more parameters allocated to it, such as, for example, an IP address or port allocated to it. The entity entry can thus define a mapping, or binding between an entity and one or more, possibly dynamically allocatable, flow parameters. The entity entry is updated to take account of the allocation of the dynamically allocatable flow parameters, whereby it is always possible to derive the current binding between an entity and a dynamic flow parameter. The QoS identifier can also be derived from the entity entry. The directory service also maintains entries for QoS definitions. The data structure maintained by the directory service thus defines mappings between flows and entities, mappings between entities and QoS identifiers and mappings between QoS identifiers, and QoS definitions. The QoS definitions contain configuration rules and/or links (e.g. references) to such configuration rules. The configuration rules are typically held in the entity entries. However the configuration rules could be stored separately, with links to them from the entity entries. The configuration rules define QoS policies. A configuration rule (or policy) defines actions to be applied to a flow (e.g. bandwidth to be allocated) and also identifies to whom the actions are to be applied (e.g. all flows from location B).

The directory interface 44 manages a cache 48, communication with the directory 53 of a directory service 52 via an LDAP interface 50, and communication with the controller 40 via a directory API 46. It should be noted that the directory service 52 is separate from and external to the QoS manager 42 in the present embodiment of the invention.

Triggering of actions in the controller 40 is based on either a flow event or an entry event as is illustrated by the flow lines in FIG. 4.

Figure 5:
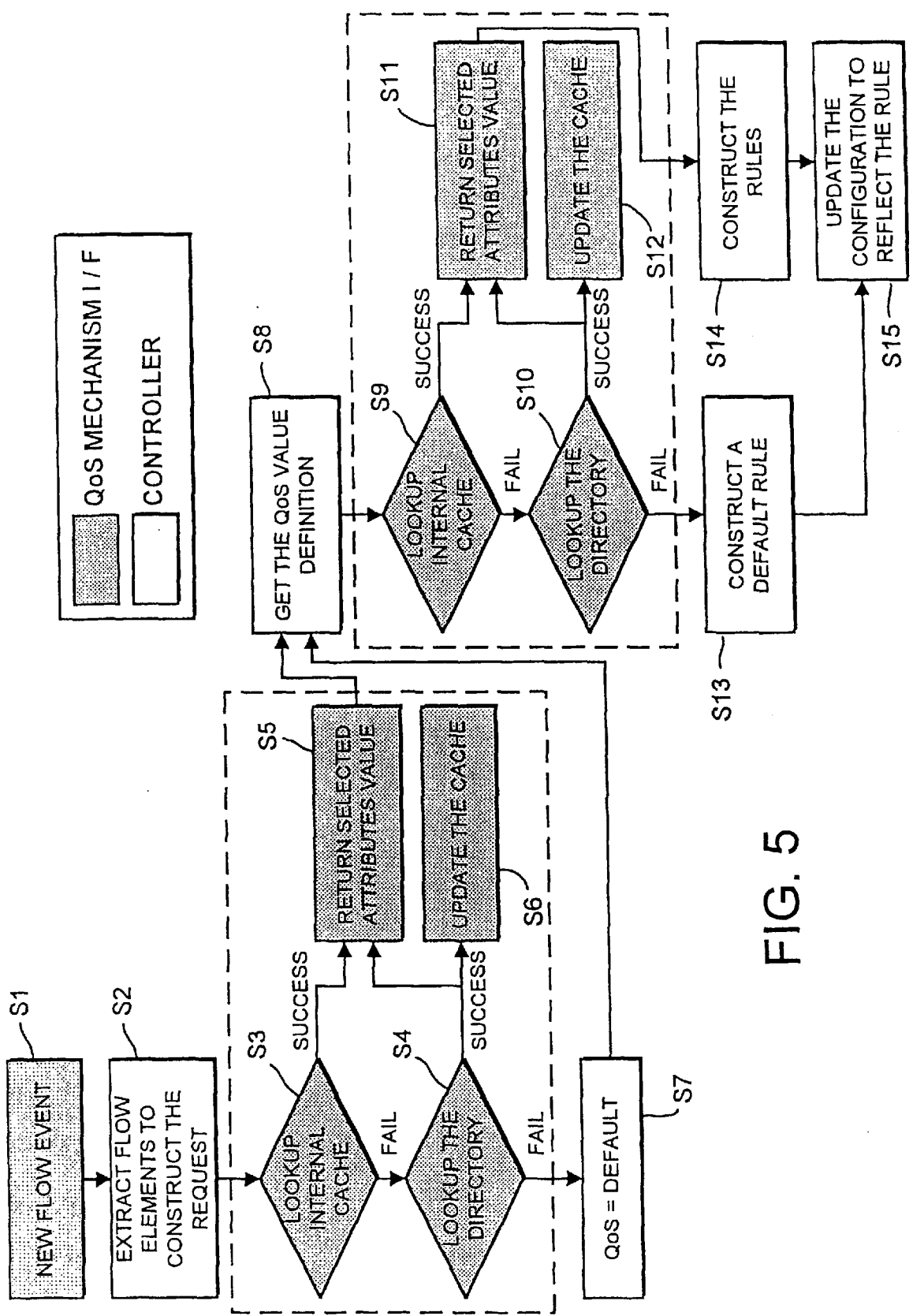
FIG. 5 is a schematic flow diagram illustrating the operation of the QoS mechanism interface and a QoS controller of the QoS mechanism of FIG. 3 when triggered by a flow event.

FIG. 5 is a schematic flow diagram illustrating the operation of the directory interface 44 and the controller 40 when triggered by a flow event.

In step S1, the QoS mechanism interface signals all subscribers that a new flow has triggered an event. The identification of a flow event can be determined internally by the controller 40, or this determination could be effected externally and could simply be reported to the controller 40.

In a particular embodiment, the controller 40 is configured to monitor all network traffic via the QoS mechanism interface 43 and to search for flows having matching QoS configuration rules. When a flow is found which does not have a QoS configuration rule applied to it (i.e. it does not have a QoS definition applied to it), then this can, for example, be determined to be a new flow, that is a flow associated with a new instance of a user.

This is illustrated below with reference to the following example:

The QoS mechanism has already allocated a QoS, say QoS=X, to a flow from company A at location B for an application C. QoS=X can comprise one of more configuration rules, for example a desired bandwidth for a flow.

The QoS mechanism is monitoring all flows from location B. On detection of a packet for a flow, flow parameters from the packet header are extracted and a comparison is made to the established configuration rules. The comparison process is summarised at (1), (2) and (3) below:

(1) If the flow parameter(s) match with a configuration rule for a QoS which has already been established—say the packet relates to a flow from company A at location B, then no new instance of an entity for a flow is determined.

(2) However, if the flow parameter(s) match with a configuration rule which requires establishment of a new QoS (say a packet for a flow for an entity at location B for which a QoS has not been established (e.g. not for company A)), then this is interpreted as a new instance of an entity associated with a flow.

(3) Also, if the flow parameter(s) do not match with any configuration rule, a default configuration rule is to be applied and this is also interpreted as a new instance of an entity associated with a flow.

The comparison process can be effected by starting at stage (1) above, i.e. at the most detailed level of the hierarchy (i.e. with the configuration rules associated with flow to entity bindings for which a QoS has already been established), and then proceeding to stage (2) and finally to stage (3). It is to be noted that the configuration rules identify not only the actions (QoS factors) but also to whom the actions are to be applied.

In step S2, the controller 40 determines a key for a request for establishing a flow-entity binding, i.e. for accessing an entity entry containing a QoS identification.

The key for the request can be based on one or more of the flow parameters, including dynamically allocatable parameters, in the following non-exhaustive list, which parameters can be derived from the flow in question (e.g. from IP headers):

a user (IP source or destination);

a service (protocol and source or destination port);

a type of service value;

the header of a URL (Universal Resource Locator).

The parameters used to form the key for a particular flow associated to a instance of an entity can be retrieved from a user profile if the flow belongs to a single user, from an application profile if the flow belongs to a single application, and so on. Thus the same applies where the entity is a group of users, services, etc. In each case, one or more flow parameters (common to all the flows belonging to an entity) is mapped to an entity profile to which the QoS is to be applied. For a user, for example, all the flows can have the same source and destination addresses. For an application, all the flows can have the same source/destination addresses and a defined set of source/destination ports. In the latter case, a directory look-up for the directory entry which belongs to this application could contain a key comprising or formed from one or more parameter combinations identified in the following non-exhaustive list:

IP source address plus source port;

IP destination address plus destination port;

IP destination address plus source port;

IP source address plus destination port.

The controller then passes to the directory interface, the request for retrieval of a QoS identification extracted from the entity entry with the key for the flow derived from one or more flow parameters as described above.

In step S3, the QoS mechanism interface 43 looks in the internal cache 48 for an entry identified by the key. If successful, a QoS identification in the cache entry identified by the key is returned (Step S5). In the case of failure, the directory interface 44 then attempts to retrieve the information from the directory server through LDAP in step S4.

In step S4, if using an LDAP search request made from the original request, the QoS mechanism interface searches the directory of the directory service for an entry identified by the key. If successful, a QoS identification in the directory entry identified by the key is returned (step S5) and the cache is updated (step S6). In the case of failure, no value is returned.

In step S5, the QoS mechanism interface returns the requested QoS identification as a value or a list of values.

In step S6, the cache is updated with the returned values as mentioned above.

In step S7, following a negative response to a QoS identification request, the controller 40 uses a default QoS identification.

The QoS identification can be in the form of a value or a set of values which can be used to access a QoS definition. A QoS definition can comprise one or more mappings or links to one or more rules which define the characteristics of the QoS definition. These rules can define a bandwidth to be applied, in absolute or relative terms, characteristics of a firewall, and so on. Accordingly, to install, or apply those rules, they need to be constructed using the QoS definition information.

Accordingly, in step S8, the controller issues a new request based on the QoS identification to retrieve the rules using the mappings identified by the QoS definition.

In step S9, the QoS mechanism interface 43 looks in the internal cache 48 for an entry or entries identified by the QoS identification concerned. If successful, the QoS definition with the attributes and values for the rules are returned (step S11). In the case of failure, the directory interface 44 then attempts to retrieve the information from the directory server through LDAP in step S10.

In step S10, the QoS mechanism interface searches the directory for an entry or entries identified by the QoS identification concerned through LDAP. If successful, the attributes and values for the rule(s) are returned (step S11) and the cache is updated (step S12). In the case of failure, no value is returned.

In step S11, the QoS mechanism interface returns the attributes and values for the requested rule(s) as a value or a list of values.

In step S12, the cache is updated with the returned values as mentioned above.

In step S10, if the directory interface fails to return details of a requested rule, a default rule is generated to avoid a loop.

In the case of success in step S9 or S10, the or each rule is constructed from the attributes and values returned in step S11.

In step S15, a QoS management function in the QoS mechanism is updated to reflect the rule(s) and thereby dynamically to apply to the flow the configuration rule or rules identified by the QoS definition.

In summary, therefore, at least one, some or all of the parameters for a flow are used as a key to derive a flow-entity binding, e.g. to retrieve a QoS identification from an entity entry in the directory. The QoS identification is then used to retrieve definitions of the rules which make up the QoS definition. At the end of the process the cache storage 48 contains the QoS identification and the retrieved QoS definition. For example, in the case of a QoS for a user, the request will be built in step S2 using the IP address, a request to the directory service (or to the cache if the information is already available) will retrieve a QoS identification (or a user's QoS profile name) and a further request to the directory service (or to the cache if the information is already available) will retrieve the rules to apply to enforce the QoS definition. The cache will then contain the IP address leading to the user's QoS profile name and to the QoS definition.

It should be noted, however, that the above described process is not mandatory. The number of steps, or redirections, between the flow and the QoS definition is not limited. Thus, for example from a flow, parameters can be used to derive a QoS identifier from an entity entry in the directory. Then the QoS identifier can be used to derive a QoS definition from a QoS definition entry. Alternatively, the QoS definition entry could be used as a source of a second QoS identifier, which could then be used to access a second QoS definition from a second QoS entry. This process could be continued further by deriving a third QoS identifier, and so on, as required.

It should also be noted that different flows could share a different QoS definition, even if they belong to different entities. Thus, if for flow 1, parameter 1 leads to QoS identification 1 retrieved from an entry for entity 1, this QoS identification 1 would be used for accessing the QoS definition 1 from a QoS definition entry. Also, for a flow 2, a parameter 2 could lead to a QoS identification 1 retrieved from an entry for the entity 2, which would also then be used to retrieve the QoS definition 1 from the same QoS definition entry.

If two flows share the same parameter (key), then they belong to the same entity. If two entities show the same QoS identification, they belong to the same class of service. However, two different entities cannot share the same parameter and two QoS definitions cannot share the same QoS identification. Thus, the parameters (keys) are unique to the entities.

It can be seen that an embodiment of the invention enables a flexible and dynamic arrangement for establishing a binding between a dynamic flow parameter and an entity. When, for example, an IP address is extracted from the header of a packet for a flow, this IP address can be used as a key to access appropriate entries for entities in the directory, given that the entries identify the current parameters for the respective entities, including, for example, the current IP address allocated thereto. The binding between the IP address and the entity for a flow can, therefore, be established.

In a further embodiment of the invention (described with reference to FIG. 6) dynamic allocation of IP addresses makes use of directory services to bind a dynamic flow parameter or parameters to an entity (e.g. an IP address to a user). In this embodiment, the triggering of the Directory Query for the QoS can be in response to a user connecting through a RADIUS login phase (or when available through the Dynamic Host Configuration Protocol (DHCP). This login phase triggers the push of an assigned QoS in the QoS server by updating the user entry with the dynamically allocated IP address. This can be achieved by, for example, using either the LDAP replication mechanism combined with a search for a QoS, or an event notification mechanism. Here the directory server used updates the user entry with the allocated IP address from an authentication mechanism such as under RADIUS.

Figure 6:
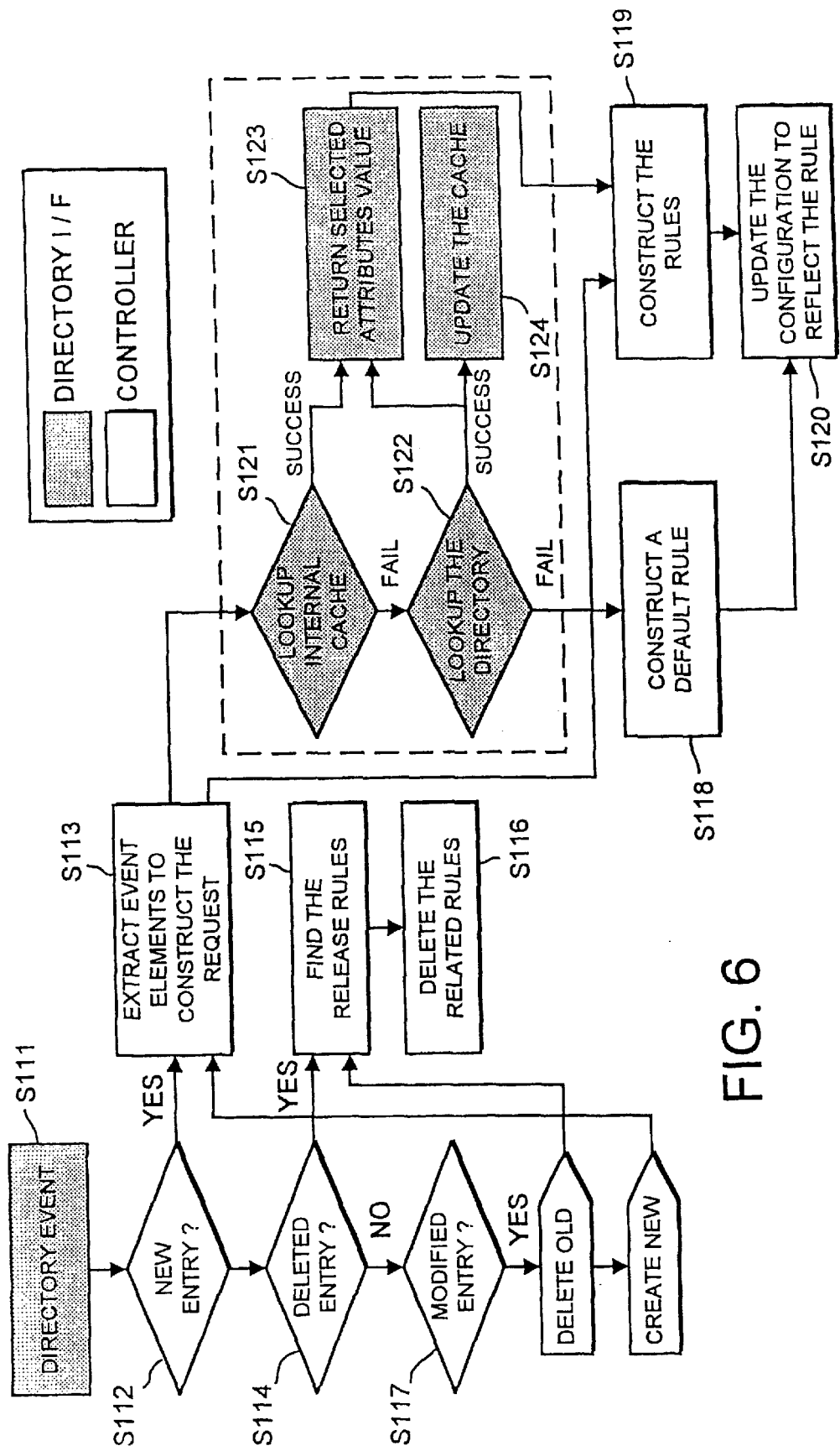
FIG. 6 is a schematic flow diagram illustrating the operation of a directory interface and a QoS controller when triggered by a directory event.

Thus, FIG. 6 illustrates a series of events for this further embodiment when a potential occurrence of a flow is linked to an identified event such as a login phase or dynamic configuration process (using DHCP or RADIUS). The disappearance of the same flow can also be linked to an event such as a logout phase or dynamic resource de-allocation (using DHCP or RADIUS). The rules importing the QoS can be a-priori installed and removed without the effective detection of the flow (a system with resources allocated without an effective use of them).

However, when events are not likely to appear for a given flow, the rules enforcing the QoS can be a posteriori installed, upon detection of data for this flow with default QoS, or no QoS, and then removed after a given period of inactivity (non-occurrence of any new data for a given flow).

This alternative can be appropriate for LANs with statically assigned IP addresses.

Figure 7:
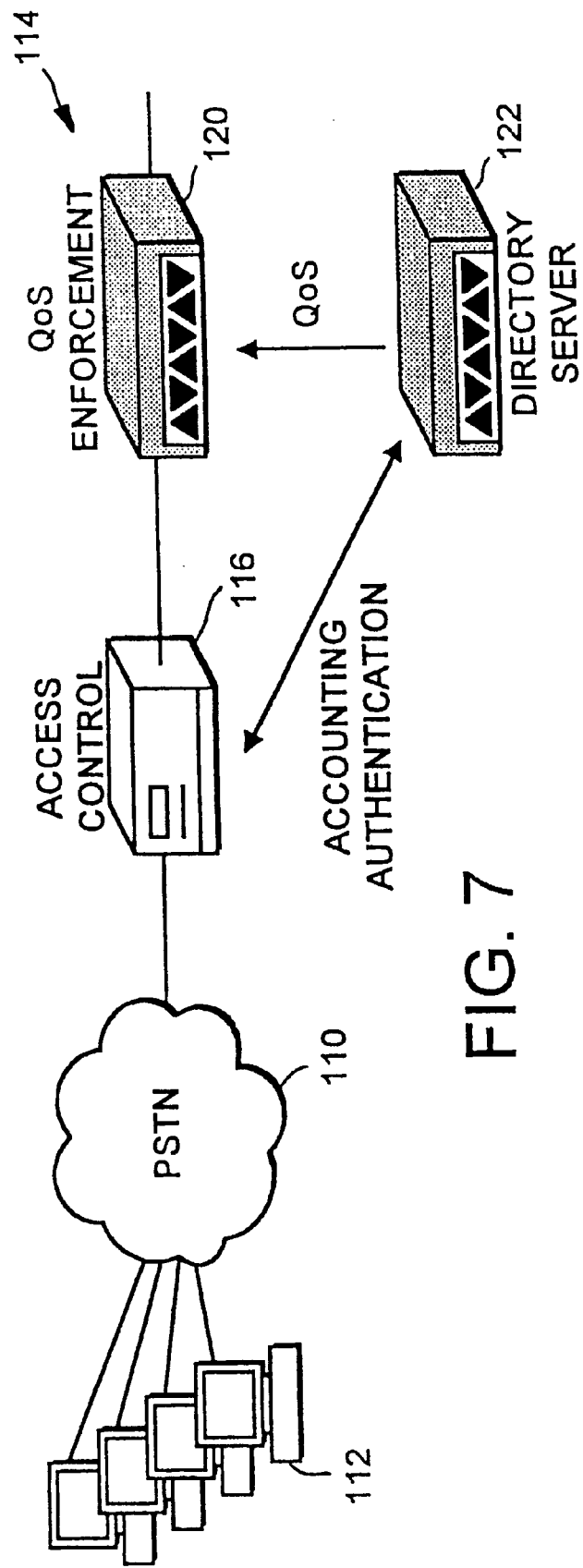
FIG. 7 is a schematic representation of an environment with either dynamic or static address allocation.

The topology of such a system is illustrated in FIG. 7. In this, users communicate via a telecommunications network, for example a packet switch telecommunications network (PSTN) 110, for example the Internet, operable under a packet switch protocol, with a server site 114. At the server site, an access controller 116 is linked to a QoS enforcement unit 120 for connection to a local network 126. A directory server 122 provides QoS information to the QoS enforcement unit 120 on the basis of accounting and authentication messages between the access controller 116 and the directory server 122.

FIG. 6 is a flow diagram illustrating of an embodiment of the invention where a replication or event notification is triggered by a directory event.

In step S111, a replication or event notification by updating the cache triggers an internal event which is forwarded to all clients of the directory interface.

In step S112, if the event is an ADD to the cache, this event carries the attributes and values added to the cache. In the case of a replication, these are only the DN (distinguished name) and the FramedIPaddress (dynamically allocated IP address) and in the case of an event notification, these are the DN plus the FramedIPaddress and the QoS related attributes.

In step S113 it is not sufficient to create a rule which generates a request to the directory for the missing attributes in the case of the parameters identified above with respect to step S112. Accordingly, in step 113, it is necessary to extract event elements to construct the request.

In step S114, if the event is a DELETE event, the only parameter available in the event is the DN.

Based on this DN, in step S115, the previously generated rules are found.

In step S116, the related rules are deleted.

In step S117, if it is a MODIF (modified) event, this carries either only the DN and the framed IP address in the case of replication triggered by modification of the dynamically allocated address, or the modified QoS related attributes and the DN in the case of a replication of the modification of these attributes, or an event notification.

The modified event can be a deletion or a creation as illustrated in FIG. 6.

In the case of creation of a new entry from step S112 or step S117, control passes to step S113 identified above.

Steps S121, S122, S123 and S124 correspond to steps S9, S10, S11 and S12, respectively, of FIG. 5.

In step S118, after collection of all the QoS related attributes it is necessary to build the rules. In the case of failure a default rule is generated.

In step S119, if all of the attributes are available, a rule reflecting this QoS is generated.

In step S120, the configuration is updated to reflect the new rules and thereby dynamically to apply to the flow the configuration rule or rules identified by the QoS definition.

It should be noted that an embodiment of the invention could, for example, provide for the functionality of either of FIGS. 5 or 6, or indeed the functionality of both of FIGS. 5 and 6, as required.

There have thus been described methods and apparatus for associating respective QoS definitions, each including one or more configuration rules, to information flows based on respective identifiers (e.g. QoS identifications), which identifiers are each uniquely derived from parameters representative of the flow concerned. The allocation of a QoS definition is carried out in response to detection of an new instance of an entity in association with an information flow, for example in response to the detection of a directory event and/or a new flow event.

The directory service is used to establish a flow to entity binding in a flexible manner.

The method can include retrieving parameters from the directory service. In some cases only selected information (e.g., an IP address) needs to be retrieved from the directory server as other parameters for the user's information flow may be available from the information flow itself. The method can also include maintaining one or more parameters, QoS identifications, QoS definitions and configuration rules in the directory service. Cache storage for at least some parameters and/or QoS identifications and/or QoS definitions and/or configuration rules can be provided, for example in the directory interface. Entries in the cache are updated to mirror corresponding entries in the directory. The directory interface can be operable initially to access the cache for retrieving a parameter, QoS identification or definition or configuration rule, if present, and if not present to then retrieve the parameter, QoS identification or definition or configuration rule from the directory service. The controller preferably maintains active QoS configuration rules. The directory interface is preferably configured to communicate with the directory service under the Lightweight Directory Access Protocol.

It will be appreciated that although particular embodiments of the invention have been described, many modifications/additions and/or substitutions may be made within the spirit and scope of the present invention as defined in the appended claims. With reference to those claims, it is to be noted that combinations of features of the dependent claims other than those explicitly enumerated in the claims may be made with features of other dependent claims and/or independent claims, as appropriate, within the spirit and scope of the present invention.

For example, in the above description reference has been made to detection of the presence of a new user and the provision of a QoS based on a user profile. However, more generally, it should be noted that the invention relates to detection of the presence of a new entity and the provision of a QoS based on an entity profile. The "entity" could be a user, and application, a piece of equipment, or other network entity, and need not be a unitary entity, but could be a compound entity such as a group of users, a set of equipment, etc. Also, it is should be noted that the invention is of particular relevance to environments where dynamic flow parameter allocation is employed, such as dynamic allocation of IP address to users and dynamic port allocation for applications such as RPC (remote procedure call) applications, by way of example only.

What is claimed is:

1. A computer-implemented method of allocating a Quality of Service to a flow on a network, the method comprising:
   i) detecting a new instance of an entity associated with said flow on said network, said flow having associated therewith at least one parameter allocated to said entity;
   ii) determining a flow to entity binding between said flow and said entity based on said at least one parameter of said flow;
   iii) using said flow to entity binding to access a Quality of Service definition for said entity, said Quality of Service definition being maintained in a directory service of said network and including at least one configuration rule for said flow, wherein said Quality of Service definition binds said flow with said Quality of Service; and
   iv) dynamically applying to said flow said at least one configuration rule identified by said Quality of Service definition.

2. The method of claim 1, wherein step (i) comprises responding to a flow event representative of said new instance of said entity associated with said flow on said network.

3. The method of claim 2, wherein step (i) comprises comparing at least one said parameter of said flow to at least one configuration rule and identifying said new instance of said entity associated with said flow where said at least one parameter of said flow matches with a specific configuration rule.

4. The method of claim 3, wherein step (i) comprises comparing at least one said parameter of said flow to at least one configuration rule and identifying said new instance of said entity associated with said flow where said at least one parameter of said flow matches with a default configuration rule.

5. The method of claim 1, wherein step (i) comprises responding to a directory event representative of said new instance of said entity associated with said flow on said network.

6. The method of claim 1, wherein at least one said parameter of said flow is a dynamically allocated parameter extracted from a protocol header.

7. The method of claim 1, wherein step (ii) comprises:
   retrieving a Quality of Service identification corresponding to said flow to entity binding, said Quality of Service identification being maintained in an entry for said entity in a directory of said directory service.

8. The method of claim 7, wherein step (iii) comprises:
   using said Quality of Service identification to retrieve said Quality of Service definition, said Quality of Service definition being maintained in an entry for said Quality of Service definition in a directory of said directory service.

9. The method of claim 1, wherein at least one said configuration rule comprises a link to at least one dynamically variable flow parameter in a directory entry for a said entity.

10. The method of claim 1, wherein at least one of steps (i)–(iv) is performed in a network element separate from said directory service and communication between said network element and said directory service is under LDAP (Lightweight Directory Access Protocol).

11. The method of claim 10, further comprising steps of maintaining a local cache in said network element for at least one Quality of Service identification corresponding to said flow to entity binding, wherein step (ii) comprises:

initially accessing said cache for retrieving said Quality of Service identification, if present, and, if not present, accessing said directory service for retrieving said Quality of Service identification.

12. The method of claim 10, further comprising steps of maintaining a local cache in said network element for at least one said Quality of Service definition, wherein step (iii) comprises:

initially accessing said cache for retrieving said Quality of Service definition, if present, and, if not present, accessing said directory service for retrieving said Quality of Service definition.

13. A Quality of Service mechanism for allocating a Quality of Service to a flow on a network, said Quality of Service mechanism comprising:

a controller configured to be responsive to detection of a new instance of an entity associated with said flow on said network to determine a flow to entity binding between said flow and said entity based on at least one parameter of said flow, said at least one parameter being associated with said entity; and a directory interface configured to use said flow to entity binding to access a Quality of Service definition for said entity, said Quality of Service definition being maintained in a directory service of said network and including at least one configuration rule for said flow, wherein said Quality of Service definition binds said flow with said Quality of Service;

said controller further being configured to be operable dynamically to apply said at least one configuration rule identified by said Quality of Service definition to said flow.

14. The mechanism of claim 13, wherein said controller is configured to be responsive to a flow event representative of said new instance of said entity associated with said flow on said network.

15. The mechanism of claim 14, wherein said controller is further configured to be operable to compare at least one parameter of said flow to at least one configuration rule and to identify said new instance of an entity associated with said flow where said at least one parameter of said flow matches with a specific configuration rule.

16. The mechanism of claim 15, wherein said controller is further configured to be operable to compare at least one parameter of said flow to at least one configuration rule and to identify said new instance of an entity associated with said flow where said at least one parameter of said flow matches with a default configuration rule.

17. The mechanism of claim 13, wherein said controller is configured to be responsive to a directory event representative of said new instance of said entity associated with said flow on said network.

18. The mechanism of claim 13, wherein at least one said parameter of said flow includes at least one dynamically allocated parameter extracted from a protocol header.

19. The mechanism of claim 13, wherein said directory interface is also configured to retrieve a Quality of Service identification corresponding to said flow to entity binding, said Quality of Service identification being maintained in an entry for said entity in a directory of said directory service.

20. The mechanism of claim 19, comprising a cache for at least one said Quality of Service identification.

21. The mechanism of claim 20, wherein said directory interface is operable initially to access said cache for retrieving said Quality of Service identification, if present, and, if not present, to access said directory service for retrieving said Quality of Service identification.

22. The mechanism of claim 13, comprising a cache for at least one said Quality of Service definition.

23. The mechanism of claim 22, wherein said directory interface is operable initially to access said cache for retrieving said Quality of Service definition, if present, and, if not present, to access said directory service for retrieving said Quality of Service definition.

24. The mechanism of claim 13, wherein at least one said configuration rule comprises a link to at least one dynamically variable flow parameter in a directory entry for a said entity.

25. The mechanism of claim 13, wherein said directory interface is configured to communicate with said directory service under LDAP (Lightweight Directory Access Protocol).

26. A network element comprising a Quality of Service mechanism operable to allocate a Quality of Service to a flow on a network, wherein said Quality of Service mechanism comprises:

a controller configured to be responsive to detection of a new instance of an entity associated with said flow on said network to determine a flow to entity binding between said flow and said entity based on at least one parameter of said flow, said at least one parameter being associated with said entity; and a directory interface configured to use said flow to entity binding to access a Quality of Service definition for said entity, said Quality of Service definition being maintained in a directory service of said network and including at least one configuration rule for said flow, wherein said Quality of Service definition binds said flow with said Quality of Service;

said controller further being configured to be operable dynamically to apply said at least one configuration rule identified by said Quality of Service definition to said flow.

27. A Quality of Service server for a computer network, said Quality of Service server comprising a Quality of Service mechanism operable to allocate a Quality of Service to a flow on a network, wherein said Quality of Service mechanism comprises:

a controller configured to be responsive to detection of a new instance of an entity associated with said flow on said network to determine a flow to entity binding between said flow and said entity based on at least one parameter of said flow, said at least one parameter being associated with said entity; and a directory interface configured to use said flow to entity binding to access a Quality of Service definition for said entity, said Quality of Service definition being maintained in a directory service of said network and including at least one configuration rule for said flow, wherein said Quality of Service definition binds said flow with said Quality of Service;

said controller further being configured to be operable dynamically to apply said at least one configuration rule identified by said Quality of Service definition to said flow.

28. A Quality of Service system operable to allocate a Quality of Service to a flow on a network, wherein said Quality of Service system comprises:

means for detecting a new instance of an entity associated with said flow on said network, said flow having associated therewith at least one parameter allocated to said entity;

means for determining a flow to entity binding between said flow and said entity based on said at least one parameter of said flow;

means for accessing a Quality of Service definition for said entity using said flow to entity binding, said Quality of Service definition being maintained in a directory service of said network and including at least one configuration rule for said flow, wherein said Quality of Service definition binds said flow with said Quality of Service; and means for dynamically applying said at least one configuration rule identified by said Quality of Service definition to said flow.

29. A Quality of Service software product on a storage medium, said software product being operable to allocate a Quality of Service to a flow on a network and being configured to be operable:

to detect a new instance of an entity associated with said flow on said network, said flow having associated therewith at least one parameter allocated to said entity;

to determine a flow to entity binding between said flow and said entity based on said at least one parameter of said flow;

to access a Quality of Service definition for said entity using said flow to entity binding, said Quality of Service definition being maintained in a directory service of said network and including at least one configuration rule for said flow, whereby said Quality of Service definition binds said flow with said Quality of Service, and to apply said at least one configuration rule identified by said Quality of Service definition to said flow.

30. The method of claim 1, wherein said at least one parameter of said flow includes an IP address.

31. The method of claim 1, wherein said at least one parameter of said flow includes a port identifier identifying a port.

32. The mechanism of claim 13, wherein said at least one parameter of said flow includes a network address.

33. The mechanism of claim 13, wherein said at least one parameter of said flow includes a port identifier identifying a port.

34. The network element of claim 26, wherein said at least one parameter of said flow includes a network address allocated to said entity.

35. The network element of claim 26, wherein said at least one parameter of said flow includes a port identifier identifying a port allocated to said entity.

* * * * *